Dec. 22, 1959 A. Y. DODGE 2,917,937
VARIABLE SPEED DRIVE
Filed July 21, 1958 2 Sheets-Sheet 1
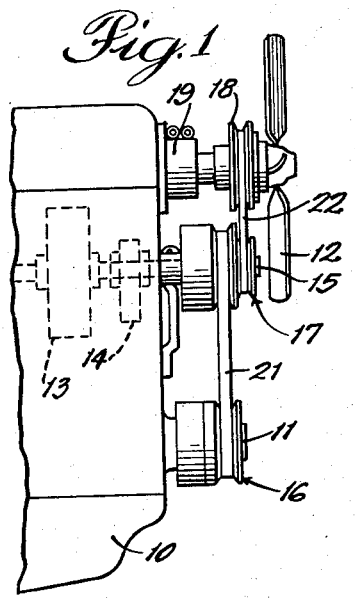
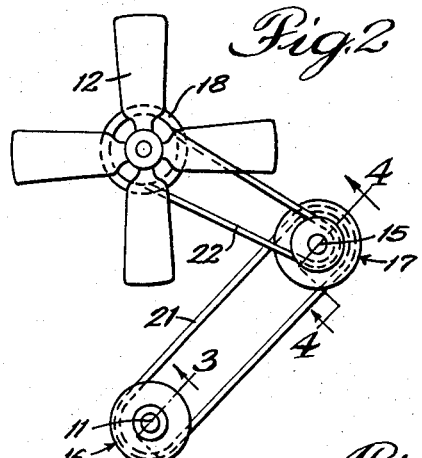
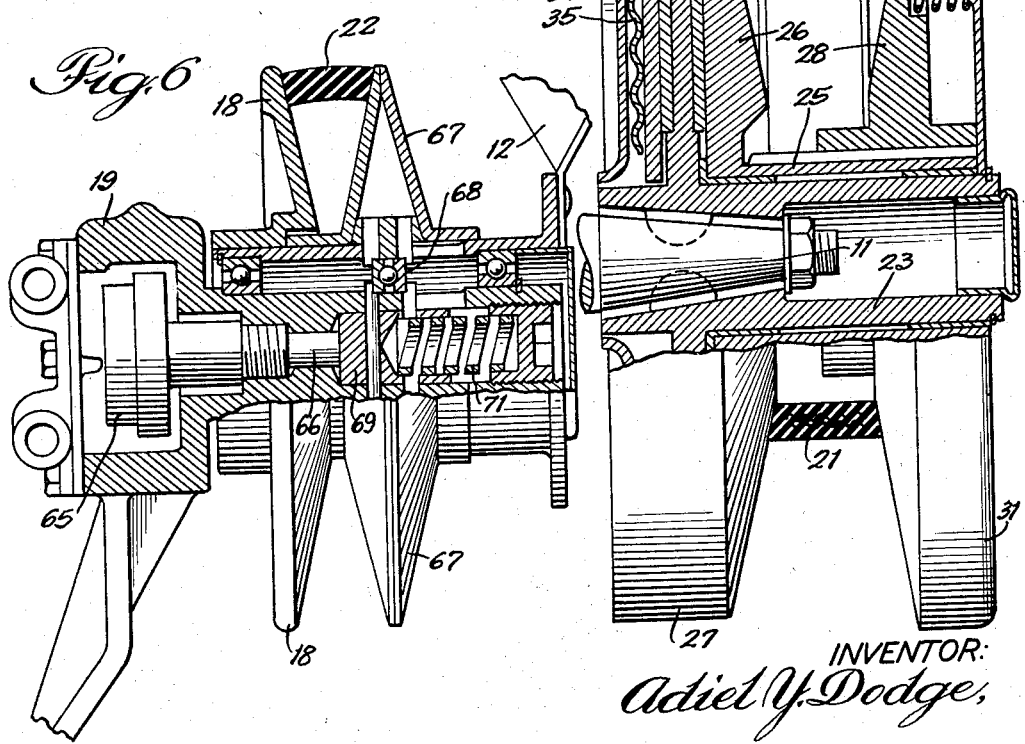
INVENTOR:
Adiel Y. Dodge,
BY Blair, Freeman & Molinare
ATTORNEYS.

Dec. 22, 1959 A. Y. DODGE 2,917,937
VARIABLE SPEED DRIVE
Filed July 21, 1958 2 Sheets-Sheet 2

INVENTOR:
Adiel Y. Dodge,
BY Pair Freeman & Molinare
ATTORNEYS.

United States Patent Office 2,917,937
Patented Dec. 22, 1959

2,917,937
VARIABLE SPEED DRIVE
Adiel Y. Dodge, Rockford, Ill.
Application July 21, 1958, Serial No. 750,009
20 Claims. (Cl. 74—336)

This invention relates to variable speed drives and more particularly to a variable speed belt type drive for driving the fan and other engine accessories of an internal combustion engine. In the operation of internal combustion engines it is highly desirable to drive the engine accessories, such as compressors, pumps and the like, at a substantially constant speed for more efficient operation of the accessory and also to minimize the horsepower required for driving the accessory and which is wasted when the accessory is driven at excessive speed. It is furthermore desirable to vary the speed of the engine cooling fan in accordance with cooling requirements rather than to drive the fan proportionately to engine speed. Various proposals for driving fans at variable speeds have heretofore been made, certain of which are disclosed and claimed in my Patents No. 2,658,400 and No. 2,732,831.

It is one of the objects of the present invention to provide a variable speed drive for the fan and accessories of an engine by which the accessories are driven from the engine through a variable speed ratio drive tending to maintain the accessory speed more nearly constant and the fan is driven from the accessory drive at a speed varied in accordance with cooling requirements.

Another object is to provide a variable speed drive in which torsional vibration of the engine is damped out so that the accessories and fan will be driven smoothly.

Still another object is to provide a variable speed drive in which shock loads due to excessive acceleration, either positive or negative, are largely absorbed in the drive so that damage to the driving belts or to the driven parts will be eliminated.

According to a feature of the invention, the driving sheave through which the accessories and fan are driven is connected to the engine through frictionally engaged surfaces which will slip under torsional vibration or shock loads to provide a smooth drive for the driven parts. According to other features of the invention, the accessories are driven through a variable diameter sheave belt connected to the driving sheave and whose effective diameter is controlled in accordance with its speed to maintain the speed of the accessory shaft constant within a relatively wide range. The sheave is connected to the accessory shaft through a friction clutch whose frictional engagement is decreased in response to acceleration so that it will slip in response to rapid acceleration to minimize shock on the driven parts. The fan is belt connected to a sheave on the accessory shaft through a variable sheave on the fan shaft whose effective diameter is controlled in response to engine temperature.

The above and other objects and features of the invention will be more readily apparent from the following description when read in connection with the accompanying drawings, in which:

Figure 1 is a partial diagrammatic side view of an engine equipped with a variable speed drive embodying the invention;

Figure 2 is a front view showing the drive of the fan and engine accessories;

Figure 3 is an enlarged sectional view on the line 3—3 of Figure 2;

Figure 6 is a sectional view through the fan drive sheave.

Figure 4:
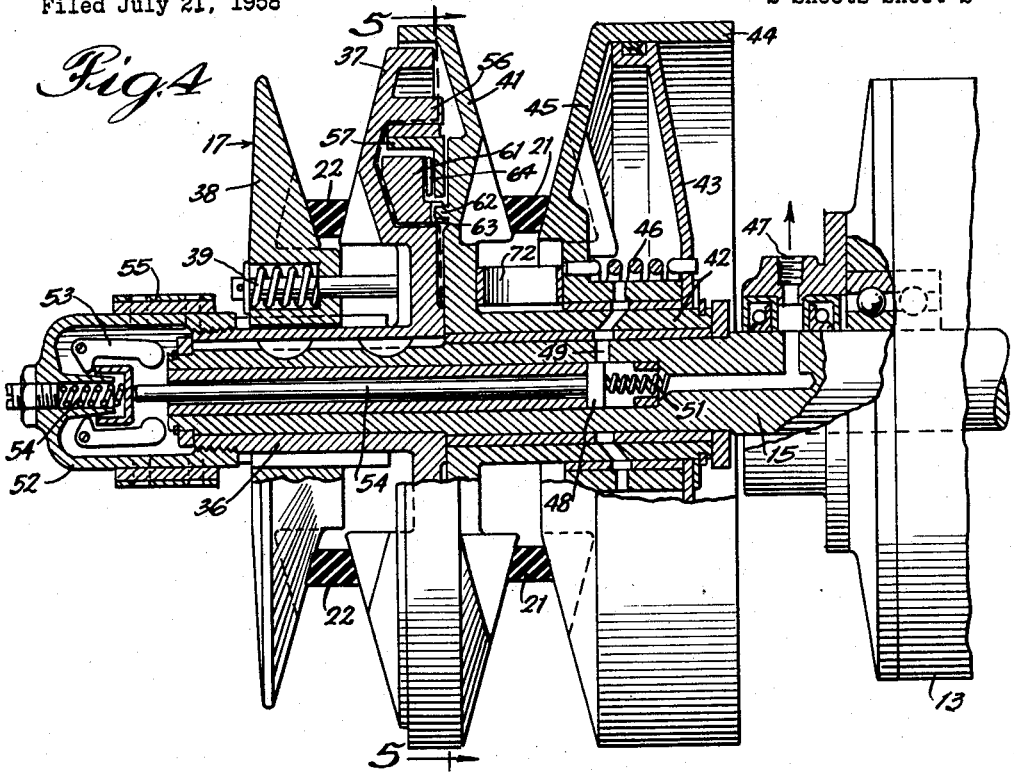
Figure 4 is an axial section of the accessory shaft sheave on the line 4—4 of Figure 2.

The variable speed drive, as shown, may be applied to any conventional type of engine partially shown at 10 which has a driving shaft 11 which may be an extension of the crank shaft.

As shown in Figure 1, the variable speed drive of the present invention is applied to driving the fan and accessories of an internal combustion engine, partially shown at 10, which has a driving shaft 11 which may be an extension of the crankshaft. The engine is provided with a cooling fan 12 mounted behind the radiator for the cooling system in the usual manner and in addition has various other accessories such as a compressor indicated at 13 and a hydraulic pump indicated at 14 for supplying operating fluid to power steering mechanism, window operators, and the like. The accessories 13 and 14, together with such other accessories as may be required are connected to an accessory drive shaft 15.

To drive the fan and the accessory shaft, the driving shaft 11 carries a driving sheave, indicated generally at 16, and the accessory shaft 15 carries a double sheave, indicated generally at 17. The fan shaft carries a driven sheave 18 which may take the form of that more particularly shown and described in my Patent No. 2,658,400. As best shown in that patent, the sheave 18 is adapted to have its effective diameter varied in response to the temperature of the cooling liquid in the engine under the control of a thermostat mounted in a housing 19 on the engine block which communicates with the cooling system. As disclosed in said patent, the sheave 18 is adjusted in a direction to increase its effective diameter when the cooling liquid is cool and to decrease its effective diameter thereby to increase the fan speed when the cooling liquid is hot. A belt 21 is trained over the driving sheave 16 and one section of the double sheave 17 and a similar belt 22 is trained over the other section of the double sheave and the driven sheave 18 so that the accessory shaft and the fan will both be driven when the engine is operating.

The driving sheave 16, as best seen in Figure 3, comprises a hub 23 fixed to the driving shaft 11 and provided with a flat outwardly extending plate 24, a hub 25 is rotatable on the hub 23 and is formed with a cone member 26 having a flat outer face parallel to the plate 24 and a peripheral flange 27 extending over the periphery of the plate 24. The sheave is completed by a cone member 28 shiftable axially on the hub 23 and urged toward the cone member 26 by springs 29 enclosed in a cup shaped housing member 31 secured to the hub 23. With this construction the effective diameter of the driving sheave can vary in response to changes in tension on the belt 21 produced by changes in the effective diameter of the first section of the double sheave 17.

According to a feature of the invention, the driving sheave is driven through frictionally engaged surfaces to provide damping for torsional vibrations in the engine. For this purpose the plate 24 may carry friction material 32 on its opposite faces and an annular pressure plate 33 is mounted within the flange 27 for sliding movement toward the cone member 26. The outer end of the flange is closed by a fixed cover plate 34 and a spring 35 acts between the cover plate 34 and the pressure plate 33 to urge the pressure plate toward the flat outer face of the cone member 26. In this way the plate 24 is frictionally engaged at its opposite faces by the cone member 26 and the pressure plate 33.

In normal operation the friction between the driving plate 24 and the cone member 26 and pressure plate 33 is sufficient to turn the driving sheave and drive the accessory shaft and fan. In the event of high torsional vibrations in the engine there will be a high resistance to rapid turning of the driving sheave due to the inertia of the sheave itself, the belts, the driven sheaves 17 and 18 and the fan and accessories. Due to this inertia the driving plate 24, which will vibrate with the engine, will slip against the friction surfaces so that a smooth drive for the accessory shaft and the fan is provided. By the use of this vibration damper the usual vibration damper employed on engines may be omitted. The mass inertia effect of the driven parts makes it possible to reduce the mass heretofore employed in the usual vibration damper and yet provide an equal or increased damping effect thereby deadening vibration in the parts being driven and in the entire motive power system.

The double sheave 17 is constructed, as best seen in Figure 4, with a hub 36 secured on the accessory shaft 15 against axial and rotational movement. The hub is formed with an outwardly projecting annular flange 37 providing a conical face on one side and preferably hollow on its opposite side to receive the clutch mechanism described hereinafter. The conical face of the flange 37 faces a conical surface on a sheave element 38 which is slidable on the hub 36 and is urged toward the flange 37 by springs 39. The belt 22 engages the conical surfaces of the flange 37 and the sheave element 38, as shown, and will shift the element 38 away from the flange 37 in response to belt tension as the effective diameter of the fan driving sheave 18 varies, as described more fully hereinafter.

The double sheave 17 is completed by a sheave element 41 lying adjacent to the flange 37 and facing in the opposite direction. The sheave element 41 is mounted on a hub 42 which is rotatable on the shaft 15, but which is held against axial movement thereon. The hub 42 rigidly carries a piston disc 43 whose outer surface slidably seals against an axially extending flange 44 on a sheave element 45 which is slidable on the hub 42 and which has a conical surface facing the conical surface of the element 41. The belt 21 engages between these last named conical surfaces, as shown.

The sheave element 45 is shifted axially to vary the effective diameter of the right-hand sheave section of the double sheave 17 in response to the speed of the accessory shaft. For this purpose a spring 46 is provided acting between the piston disc 43 and the sheave element 45 urging the sheave element 45 to the left to its maximum effective diameter. The sheave element is adapted to be moved to the right to the position shown by vacuum which is supplied through a port 47 and through a bore in the accessory shaft 15, as shown. Connection of the vacuum source to the space between the piston disc 43 and sheave element 45 is controlled by a slidable valve 48 controlling a port 49 in the accessory shaft 15 and which communicates with the space between the piston disc 43 and sheave element 45. The valve 48 is normally shifted to its left-hand position, as shown, by a spring 51 and in this position connects the motor space to the source of the vacuum so that the sheave element 45 will be shifted to the right for minimum effective sheave diameter. The valve is adapted to be shifted to the right to vent the motor space by a speed responsive governor driven by the shaft 15. As shown, the governor comprises a casing 52 secured to the hub 36 so that it will rotate at shaft speed and in which are pivotally mounted a plurality of governor weights 53. A spring 54 normally urges the weights inward to the position shown, but as the speed increases they will move outward to shift the valve 48 to the right through a valve rod 54. When the valve has been shifted far enough to the right the motor space between piston disc 43 and sheave element 45 will be vented through the space around the rod 54 and through a suitable air filter 55 so that the sheave element 45 can be moved to the left by the spring 46.

Figure 5:
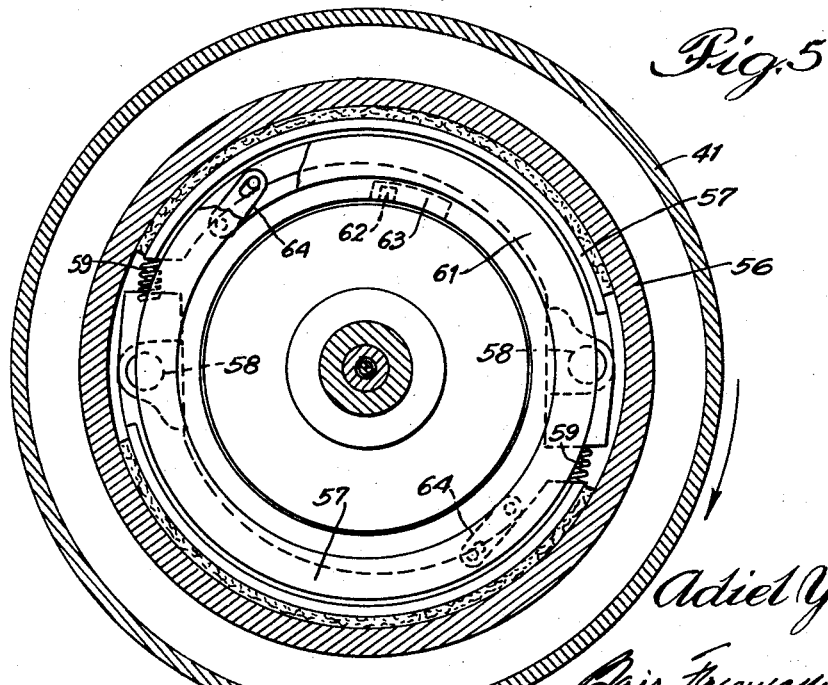
Figure 5 is a sectional view on the line 5—5 of Figure 4.

The right-hand section of the double sheave 17, which constitutes the driving section, is connected to the left-hand section and to the accessory shaft 15 through a friction clutch whose degree of frictional engagement is varied in response to acceleration. As shown, the clutch is formed by an annular drum 56 on the flange 37 which is adapted to be engaged by arcuate friction shoes 57 pivoted on the sheave element 41, as best seen in Figure 5. As shown in Figure 5, there are two friction shoes 57 pivoted at diametrically opposite points 58 on the sheave element 41 and normally urged outwardly into engagement with the drum 56 by springs 59, each spring acting between the pivoted end of one friction shoe and the free end of the other friction shoe.

Upon rapid acceleration of the driving sheave section the friction shoes are adapted to have their frictional engagement reduced so that they may slip more readily against the drum 56. For this purpose an annular weight 61 is rotatably mounted on the flange 37 within the friction shoes, as shown, and is rotatable relative to the flange 41 through a limited arcuate degree. The amount of rotation is limited by a pin or key 62 carried by the flange 41 and extending into a short arcuate slot 63 in the inner surface of the weight, as shown in Figure 5. The weight is connected to the friction shoes through links 64 which preferably have a lost motion pivotal connection with the shoes so that they can normally move fully into engagement with the drum and which will tend to move the friction shoes away from the drum 56 upon rotation of the weight counterclockwise relative to the sheave element 41, as seen in Figure 5.

The fan drive pulley 18 is varied in response to the temperature of the engine, as described above, and as more particularly shown and described in my Patent No. 2,658,400. For this purpose the housing 19 is connected to the cooling system of the engine so that the engine coolant may circulate therethrough. A thermostat 65 is mounted in the housing 19 and is adapted to shift a rod 66 which is slidable within the hub of the sheave. The left-hand section of the sheave is fixed against axial movement and the right-hand section, as shown at 67, is connected through a bearing 68 to a block 69 on the end of the rod 66. A spring 71 urges the block 69 and right-hand sheave section 67 to the left or maximum diameter position, as shown.

In operation with the engine cold and at rest or turning at low speed the sheave section 28 and the driving sheave 16 will be shifted to the left by the springs 29 so that this sheave will have its maximum effective diameter. When the engine is started, the sheave section 45 of the right-hand section of the double sheave 17 will be pulled to the right by a vacuum, as shown in Figure 4, so that this sheave section will have its minimum effective diameter and will be driven at the maximum speed ratio from the driving sheave through the belt 21. With the engine cold the fan drive sheave 18 will occupy this maximum diameter position, as shown in Figure 6, and the belt 22 will cause the left-hand section of the double sheave 17 to move to its minimum diameter position, as shown in Figure 4. At this time the accessory shaft will be driven from the engine at maximum speed ratio relative to the engine speed and the fan will be driven at minimum speed since the engine is cool.

As the engine speed increases the weights 53 will move out and shift the valve 48 to the right to vent the motor space between the piston disc 43 and the sheave element 45 so that the sheave element 45 can be moved more or less to the left to increase the effective sheave diameter. It will be noted that the valve 48 will lap when the speed of the shaft 15 is at approximately the desired value so that the sheave element 45 will be held in a position which will produce approximately the desired speed of the shaft. Actually, considerable latitude is permissible in the accessory shaft speed so that its speed may vary from about 1600 r.p.m. when the engine is idling to about 2400 r.p.m. when the engine is turning at 4000 r.p.m. The actual speeds can, of course, be controlled by design so that the accessory shaft speed can be maintained within desired overall limits. If the speed of the accessory shaft should fall below the desired minimum, the valve 48 will again be moved to the left by the spring 51 to reconnect the motor space to the vacuum source and to shift the sheave element 45 to the right to decrease the effective sheave diameter and simultaneously to effect an increase in the diameter of the driving sheave through changes in belt tension.

The driving section of the double sheave 17 will normally drive the accessory shaft 15 through the left-hand, as seen in Fig. 1, or driven section 41—45 of the double sheave and through the friction clutch mechanism. If there should be a sudden acceleration which would impose undesired shock on the accessories and fan the annular weight 61 will be accelerated clockwise, due to its inertia as seen in Figure 5, to exert an inward pull on the friction shoes 57 through the links 64. This will reduce the effective torque transmitting capacity of the friction clutch so that it can slip more easily than normally at this time. Therefore, the sudden acceleration or acceleration shock will not be transmitted through the clutch to the accessory shaft or the fan and the accessory shaft speed can be maintained more closely at the desired value without damage to the belts or to the accessories driven thereby. If desired, the parts of the driving section of the double pulley 17 may be made more fully responsive to acceleration by connecting them through an annular strap element 72, as more particularly described and claimed in my copending application Serial No. 681,580, filed September 3, 1957. A positive fluid pressure motor could be used in place of a vacuum motor, as disclosed in said application.

As the engine temperature increases the thermostat 65 will expand moving the sheave element 67 to the right against the spring 71 to decrease the effective diameter of the fan sheave 18. Simultaneously the effective diameter of the left-hand driving section of the double sheave 17 will be increased by the belt tension. The fan speed will therefore be increased in response to engine temperature so that the fan will be driven at all times at the most effective speed corresponding to existing cooling requirements.

This application is a continuation-in-part of my copending applications Serial No. 592,038, filed June 18, 1956, now abandoned, and Serial No. 681,580, filed September 3, 1957.

While one embodiment of the invention has been shown and described herein, it will be understood that it is illustrative only and not to be taken as a definition of the scope of the invention, reference being had for this purpose to the appended claims.

What is claimed is:

1. A variable speed drive for the accessories and fan of an engine comprising a variable diameter driving sheave adapted to be driven by the engine at a speed proportional to engine speed, a spring urging the sheave to maximum diameter, a variable diameter driven sheave adapted to be secured to a fan, means responsive to the temperature of the engine to vary the diameter of the driven sheave, a double variable sheave adapted to be secured to an accessory driving shaft of the engine, a belt connecting the driving sheave to a first section of the double variable sheave, means responsive to the speed of the double variable sheave to change the diameter of the first section in a direction tending to maintain the speed of the accessory shaft constant, a belt connecting a second section of the double sheave to the driven sheave, and a spring urging the second section of the double sheave to maximum diameter.

2. The construction of claim 1 in which the driving sheave includes a plate driven by the engine, a surface on the driving sheave frictionally engaging the plate, and a spring urging the plate and surface into frictional engagement with each other.

3. A variable speed drive for the accessories and fan of an engine comprising a variable diameter driving sheave adapted to be driven by the engine at a speed proportional to engine speed, a spring urging the sheave to maximum diameter, a variable diameter driven sheave adapted to be secured to a fan, means responsive to the temperature of the engine to vary the diameter of the driven sheave, a double variable sheave adapted to be secured to an accessory driving shaft of the engine, said double variable sheave including a central double cone member fixed against axial movement, a first axially shiftable cone member at one side of the double cone member, means responsive to the speed of the double cone member operatively connected to the first axially shiftable cone member to urge it toward the double cone member in response to speed, a belt trained over the driving sheave and the sheave defined by the double cone member and the first axially shiftable cone member, a second axially shiftable cone member on the other side of the double cone member, a spring urging the second axially shiftable cone member toward the double cone member, and a belt trained over the driven sheave and the sheave defined by the second axially shiftable cone member and the double cone member.

4. The construction of claim 3 in which the driving sheave comprises a pair of facing cone members mounted for relative axial movement, a plate driven by the engine and lying adjacent to one of the cone members, and a spring urging the plate and said one of the cone members into frictional engagement.

5. A variable speed drive for engine accessories comprising a variable driving sheave having a flat axially facing friction surface, a flat friction driving plate, a spring urging the driving plate frictionally into engagement with said surface for drivably connecting the driving sheave to the engine, a spring urging the driving sheave to its maximum effective diameter, a variable driven sheave, means responsive to an operating condition of a mechanism to be driven to vary the diameter of the driven sheave, and a belt connecting the driving and driven sheaves, the friction surfaces being adapted to slip in response to torsional vibration of the engine and due to the inertia of the sheaves and belt to provide a smooth drive for the driven sheave.

6. A variable speed drive for engine accessories comprising a variable driving sheave having a flat axially facing friction surface, a flat friction driving plate, a spring urging the driving plate frictionally into engagement with said surface for drivably connecting the driving sheave to the engine, a spring urging the driving sheave to its maximum effective diameter, a variable driven sheave, means responsive to the speed of the driven sheave to vary its effective diameter, and a belt connecting the driving and driven sheaves.

7. In a variable speed drive, a driving sheave comprising a pair of facing cone members mounted for relative axial movement, one of the members having a smooth outer surface, a driving plate adjacent to and frictionally engaging said surface, and a spring urging the plate into frictional engagement with said surface.

8. In a variable speed drive, a driving sheave comprising a pair of facing cone members mounted for relative axial movement, a peripheral flange on one of the members defining an annular cavity, a driving plate lying in the cavity adjacent to the outer surface of said one of the members, a pressure plate in the cavity engageable with the driving plate to urge it frictionally into engagement with said one of the members, and a spring in the cavity urging the pressure plate toward the driving plate.

9. In a drive for automotive accessories, the combination of a driving shaft, an accessory shaft, a fan shaft, means to drive the accessory shaft at a substantially constant speed including a spring loaded variable sheave on the driving shaft, a speed responsive variable sheave on the accessory shaft, a V-belt trained over said sheaves, and variable speed means to drive the said fan shaft, including a spring loaded sheave on the accessory shaft adjacent the aforementioned speed responsive sheave, a thermostat operated variable sheave on the fan shaft, and a V-belt connecting the said spring loaded sheave with the said thermostatically controlled sheave, thereby to drive the fan shaft at variable speeds commensurate with the temperature of the thermostat.

10. The construction of claim 9 in which the first named sheave comprises a pair of facing cone members mounted for relative axial movement, one of said members having a smooth outer face, a driving plate on the driving shaft frictionally engaging said surface, and a spring urging the plate into frictional engagement with said surface.

11. A variable speed drive for engine accessories comprising a driving sheave and a driven sheave, rotatable friction driving means for one of the sheaves including frictionally engaged driving and driven parts, and a weight mounted for rotation relative to and about the axis of said one of the sheaves and turning relative thereto in response to rotary acceleration thereof and means connecting the weight to one of said parts to urge the parts out of engagement with each other when the weight turns in response to acceleration.

12. A variable speed drive for engine accessories comprising a driving sheave and a driven sheave, rotatable friction driving means for one of the sheaves including frictionally engaged driving and driven parts, an annular weight coaxial with said one of the sheaves and rotable relative thereto about the axis thereof, and means connecting the weight to the driving part to urge it out of engagement with the driven part in response to rotary acceleration of the driving part.

13. A variable speed drive for engine accessories comprising a driving sheave and a driven sheave, an annular drum connected to one of the sheaves, radially movable friction shoes engaging the drum and a weight mounted for rotation relative to and about the axis of said one of the sheaves and connected to the shoes and movable relative to said one of the sheaves in response to rotary acceleration thereof to urge the shoes out of engagement with the drum.

14. A variable speed drive for engine accessories comprising a driving sheave and a driven sheave, an annular drum connected to one of the sheaves, radially movable friction shoes engaging the drum, an annular weight coaxial with the drum and rotatable relative to said one of the sheaves about the axis thereof, and links connecting the weight to the shoes, the weight normally turning with said one of the sheaves but moving rotatively relative thereto in response to acceleration to urge the shoes away from the drum.

15. A variable speed drive comprising a double sheave including two pairs of facing conical parts mounted for axial movement relative to each other, a driving belt engaging one pair of parts to drive it from a source of power, a driven belt engaging the other pair of parts, said pairs of parts being rotatable relative to each other, and friction driving means connecting the pairs of parts.

16. A variable speed drive comprising a double sheave including two pairs of facing conical parts mounted for axial movement relative to each other, a driving belt engaging one pair of parts to drive it from a source of power, a driven belt engaging the other pair of parts, said pairs of parts being rotatable relative to each other, friction driving means connecting the pairs of parts including friction members normally frictionally engaging each other, and means responsive to acceleration of said one pair of parts to urge said members out of frictional engagement with each other.

17. A variable speed drive comprising a double sheave including two pairs of facing conical parts mounted for axial movement relative to each other, a driving belt engaging one pair of parts to drive it from a source of power, a driven belt engaging the other pair of parts, said pairs of parts being rotatable relative to each other, friction driving means connecting the pairs of parts including friction members normally frictionally engaging each other, a weight mounted coaxially with said one pair of parts for rotation relative thereto, and means connecting the weight to one of the friction members to urge it away from the other friction member upon acceleration of said one pair of parts.

18. A variable speed drive comprising a double sheave including two pairs of facing conical parts mounted for axial movement relative to each other, a driving belt engaging one pair of parts to drive it from a source of power, a driven belt engaging the other pair of parts, said pairs of parts being rotatable relative to each other, means responsive to the speed of said one pair of parts to move the parts thereof axially toward and away from each other in a direction tending to maintain the speed constant, friction driving means connecting the pairs of parts, and means responsive to acceleration of said one pair of parts to reduce the torque transmitting capacity of the friction driving means.

19. A variable speed drive for the fan and accessories of an internal combustion engine comprising a variable driving sheave adapted to be connected to the engine, friction driving means frictionally connected to the sheave to connect it to the engine, a double variable sheave adapted to be connected to an accessory shaft on the engine, a belt drivably connecting the driving sheave to one section of the double sheave, second friction driving means connecting said one section of the double sheave to the other section and to the accessory shaft, a variable sheave adapted to be connected to an engine fan, thermostatic means responsive to the temperature of the engine to control the last named variable sheave, and a belt drivably connecting the last named variable sheave to the other section of the double sheave.

20. The variable speed drive of claim 19 including means responsive to acceleration of said one section of the double sheave to reduce the effective torque transmitting capacity of the second friction driving means.

References Cited in the file of this patent

UNITED STATES PATENTS 1,983,827     Winther et al. _____ Dec. 11, 1934